(12) United States Patent
Gupta et al.

(10) Patent No.: US 7,542,979 B2
(45) Date of Patent: Jun. 2, 2009

(54) SYSTEM, METHOD AND APPARATUS FOR LOADING TEXT DATA IN A DATABASE

(75) Inventors: Atul Gupta, Sugar Land, TX (US);
Amar Singh, Bangalore (IN)

(73) Assignee: Schlumberger Technology Corporation, Houston, TX (US)

( * ) Notice: Subject to any disclaimer, the term of this patent is extended or adjusted under 35 U.S.C. 154(b) by 541 days.

(21) Appl. No.: 10/956,665

(22) Filed: Oct. 1, 2004

(65) Prior Publication Data
US 2005/0267899 A1 Dec. 1, 2005

Related U.S. Application Data

(60) Provisional application No. 60/507,576, filed on May 25, 2004.

(51) Int. Cl.
G06F 17/00 (2006.01)
(52) U.S. Cl. ........................... 707/101; 715/212
(58) Field of Classification Search ................. 707/100, 707/101; 715/212, 234
See application file for complete search history.

(56) References Cited

U.S. PATENT DOCUMENTS

| | | | |
|---|---|---|---|
| 4,815,029 A * | 3/1989 | Barker et al. ................. | 715/516 |
| 5,287,447 A * | 2/1994 | Miller et al. ................. | 715/804 |
| 5,657,460 A * | 8/1997 | Egan et al. ................... | 715/763 |
| 5,745,901 A * | 4/1998 | Entner et al. ............ | 707/103 R |
| 6,034,676 A * | 3/2000 | Egan et al. .................... | 701/29 |
| 6,188,403 B1 * | 2/2001 | Sacerdoti et al. ............ | 715/764 |
| 6,222,540 B1 * | 4/2001 | Sacerdoti ..................... | 345/581 |
| 2002/0046248 A1 * | 4/2002 | Drexler ....................... | 709/206 |
| 2004/0193646 A1 * | 9/2004 | Cuckson et al. .......... | 707/104.1 |

OTHER PUBLICATIONS

Chamberlain, D: "A complete guide to DB2 universal database" Complete Guide to DB2 Universal Database, XX, XX, 1998, pp. 1-35, 643-658, XP002239913.
Anonymous: "Oracle Warehouse Builder: A Technical Overview" Oracle Technical White Paper, XX, XX, 2000, pp. 1-21, XP002249154.
Office Action In European Patent Application No. 04 793 918.6-2201 mailed Jun. 13, 2007, 5 pages.
Durbin J. et al., Oracle 8 Utilities, Release 8.0; Chapters Dec. 3-5, 1997, 138 pages.
Office Action in European Patent Application No. 04 793 918.6-2201 mailed Mar. 13, 2008, 8 pages.

* cited by examiner

Primary Examiner—Shahid A Alam
Assistant Examiner—Joshua Bullock
(74) Attorney, Agent, or Firm—Osha Liang LLP; Bryan P. Galloway (57) ABSTRACT

The present invention includes an apparatus, method and system for loading data into a database. The invention includes a spreadsheet dataset, having data in the form of one or more records, a control file containing a set of rules, each rule having a condition and a spreadsheet loader. The spreadsheet dataset and the control file are inputs to the spreadsheet loader. Each rule in the control file is evaluated for each record to determine if the condition is true for the record, and the records are parsed if the condition is true. The spreadsheet loader sends the parsed data to the database. The invention includes a user interface to facilitate creation of the control file.

70 Claims, 8 Drawing Sheets

SYSTEM, METHOD AND APPARATUS FOR LOADING TEXT DATA IN A DATABASE

CROSS REFERENCE TO RELATED APPLICATIONS

This is a utility application of prior pending provisional application Ser. No. 60/507,576 filed May 25, 2004, and entitled "System, Method and Apparatus for Loading Text Data in a Database."

BACKGROUND OF THE INVENTION

1. Field of the Invention

This invention relates to methods and systems for use in computer software having databases. In PARTICULAR, the invention provides methods, apparatuses and systems for more effectively and efficiently loading text data into a database.

2. Prior Art

Those skilled in the art will appreciate that software programs are executed on computer systems, where a computer system includes at least a processor and memory. Further, most software programs use a database as a repository for storing data. Examples of such databases include Oracle, SQL Server, Sybase, to name a few. The data is stored in relational database tables in a pre-defined schema. The data can be created in the database using GUIs, such as for example Oracle Forms, by manual entry or, most often, by the user loading the data in the database using a software program, such as Loader.

An external storage unit, such as a disk file or a tape that contains the data to be loaded ("dataset") is usually encoded in binary or text (ASCII) format. If a software loading program is being used to load the dataset, the loading program reads the dataset, decodes the encoding and loads it in the database tables. This is a very common scenario for software used, for example, in the oil and gas industry where the need is for data to be loaded in various industry standard formats, such as DLIS, Geoshare, WITSML, to name a few. These standard formats are in binary, XML or ASCII. Therefore, for such industry data in standard formats, "custom" loaders are written to load the data. The custom loaders read a specific format and load (create/update) data in a specific repository. For example, GeoFrame DLIS Loader reads DLIS data and loads data in GeoFrame repository only.

However, there is large amount of data in text files for which no standard exists. The non-standard text files may contain data in any format and it is almost impossible to create custom loaders for all such text data layouts.

SUMMARY OF THE INVENTION

In view of the above problems, an object of the present invention is to provide improved methods, apparatuses and systems for loading data, especially in non-standard text files, into a database while eliminating or minimizing the impact of the problems and limitations described. The data in the spreadsheet dataset may be row-based data or column-based data A preferred embodiment of the present invention includes a control file containing a set of rules, each rule having a condition, and a spreadsheet loader having as inputs the spreadsheet dataset and the control file. Each rule in the control file is evaluated for each record to determine if the condition is true for the record, and the records are parsed if the condition is true. The spreadsheet loader sends the parsed data to the database.

The set of rules within the control file may include a variable rule, an entity rule or both (including but not limited to a plurality of both). The variable rule comprises a condition, a parsedescriptor, and a values clause and may include an endcondition and/or an attributelist. The entity rule is comprised of a condition and an attributelist and may include an endcondition clause and/or a referenceentity clause.

The invention may also include a user interface used to create the control file. The user interface may include a control file information section, having an object tree, attributes tab, and control file preview area, and a data file information section, having a spreadsheet data area reflecting the spreadsheet dataset. Using the user interface, selecting a business object in the object tree opens a list of one or more attributes for the business object in the attributes tab. Attributes from the open list of attributes may be dragged and dropped into columns in the spreadsheet data area; and the spreadsheet dataloader uses the attributes dropped into the spreadsheet data area to map the columns to the business objects and to create the control file from the mapping. The control file may be previewed in a control file preview area in the user interface. Attributes in the attribute tab that are mandatory for the selected business object may be distinguished from attributes that are not mandatory, such as with a color, shading, or use of a special font. The spreadsheet data area of the user interface may include editing functions. The object tree may display the business objects using a two-tier hierarchy, with a list of sub models (being groups of business objects), and with business objects under each sub model.

The invention may also include a data access layer in the database which allows entity definitions and persistence maps to be used to create new business objects in the object tree.

Attributes of the business objects are defined on the database. The attributes may be evaluated using a valueexpr clause and may be parsed using a parsedescriptor command and the value of the parsed attribute is referenced using a value clause.

A preferred embodiment of the invention includes a method for loading data from a spreadsheet dataset, having data in the form of one or more records, into a database including the steps of creating a control file having rules, each rule including a condition; inputting the spreadsheet dataset and the control file into a spreadsheet loader; evaluating each rule with respect to each record to determine if the condition for the rule is true for that record and if the condition is true, then parsing the record into one or more tokens and referencing the value of the parsed record using a value clause of the rule and sending the parsed, valued data to the database. Creating a control file may include the steps of: by using a user interface for a spreadsheet loader, selecting a business object in an object tree section of the user interface, so the selection of the business object opens a list of attributes for the selected business object in an attributes tab section of the user interface, dragging and dropping the attributes for the selected business object into columns of a spreadsheet data area of the user interface, the spreadsheet data area reflecting a spreadsheet dataset that is to be loaded by the spreadsheet loader, using the drop and dragged attributes to map the columns into which the attributes were dragged to the business objects of the dragged attributes, and generating a control file reflecting the mapping step. Further, one may preview the generated control file in a control file preview area of the user interface. Attributes in the attribute tab that are mandatory for the selected business object may distinguished from attributes that are not mandatory, such as with a color, shading, or use of a special font. The spreadsheet data area of the user interface may include editing functions. The object tree may display the business objects using a two-tier hierarchy, with a list of sub models (being groups of business objects), and with business objects under each sub model. The rules of the control file may include a variable rule, an entity rule or both. The variable rule includes a condition, a parsedescriptor, and a values clause and may include an endcondition and/or an attributelist. The entity rule includes a condition and an attributelist and may include an endcondition clause and/or a referenceentity clause. The invention may include a data access layer in the database allowing entity definitions and persistence maps to be used to create new business objects in the object tree. The attributes are defined on the database, and may be evaluated using a valueexpr clause, may be parsed using a parsdescritpor command and the value of the parsed attribute may be referenced using a value clause.

A preferred embodiment of the invention includes a system for loading data from a spreadsheet dataset (having data in the form of one or more records) into a database. The system includes a control file having rules, each rule including a condition, a spreadsheet loader having inputs of the spreadsheet dataset and the control file. The spreadsheet loader has a program storage device readable by a machine, tangibly embodying a program of instructions executable by the machine to perform the following method steps: evaluating each rule with respect to each record to determine if the condition for the rule is true for that record and if the condition is true, then parsing the record into one or more tokens and referencing the value of the parsed record using a value clause of the rule, and sending the parsed, valued data to the database. The control file of the system of this embodiment of the invention may be created by the following steps: Using a user interface for a spreadsheet loader to select a business object in an object tree section of the user interface, where the selection of the business object opens a list of attributes for the selected business object in an attributes tab section of the user interface, dragging and dropping the attributes for the selected business object into columns of a spreadsheet data area of the user interface, the spreadsheet data area reflecting a spreadsheet dataset that is to be loaded by the spreadsheet loader, mapping the columns into which the attributes were dragged to the business objects of the dragged attributes by using the drop and dragged attributes, and generating a control file reflecting the mapping step. The generated control file may be previewed in a control file preview area of the user interface. The set of rules within the control file may include a variable rule having a condition, a parsedescriptor, and a values clause and may include an entity rule, having a condition and an attributelist. Attributes in the attribute tab that are mandatory for the selected business object may distinguished from attributes that are not mandatory, such as by color, by shading, or by a special font. They could also be distinguished by sound for visually impaired users. Editing functions may be performed using the spreadsheet data area of the user interface. The object tree may display the business objects using a two-tier hierarchy, with a list of sub models, being groups of business objects, followed by business objects under each sub model. The invention may include a data access layer in the database. The data access layer may allow entity definitions and persistence maps to be used to create new business objects in the object tree. Attributes are defined on the database. Attributes may be evaluated using a valueexpr clause. Attributes may be parsed using a parsedescriptor command and the value of the parsed attribute referenced using a value clause.

An advantage of the present invention is that it provides a simple interface for loading all spreadsheet text data into a database.

Another advantage of the present invention is that it loads any text data whose layout is in spreadsheet format.

Other objects, features and advantages of the present invention will become apparent to those of skill in art by reference to the figures, the description that follows and the claims.

DETAILED DESCRIPTION OF THE DRAWINGS

In the following detailed description of the preferred embodiments and other embodiments of the invention, reference is made to the accompanying drawings. It is to be understood that those of skill in the art will readily see other embodiments and changes may be made without departing from the scope of the invention.

Figure 1:
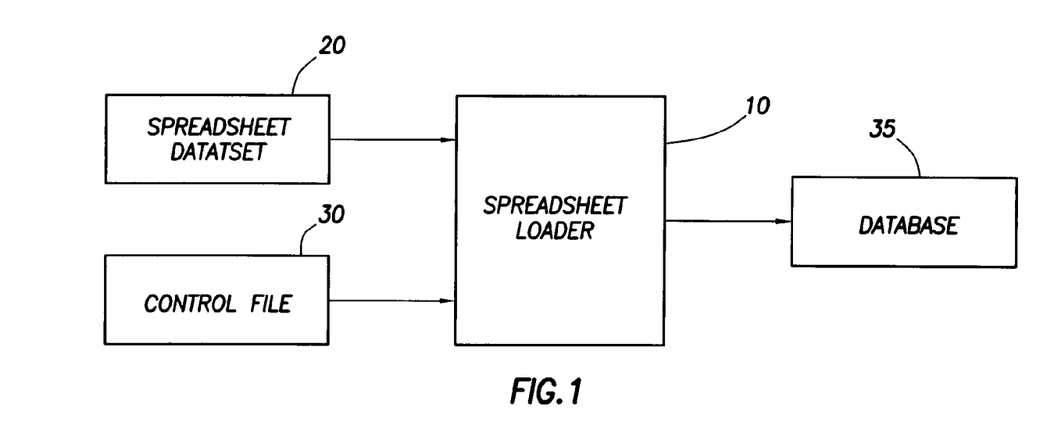
FIG. 1 illustrates inputs coming into a spreadsheet loader of a preferred embodiment of the present invention.

FIG. 1 illustrates inputs coming into a spreadsheet loader 10 of a preferred embodiment of the present invention. Those skilled in the art will appreciate that embodiments of the spreadsheet loader may be implemented on virtually any type of computer system. The spreadsheet loader 10 of this preferred embodiment has two inputs: a spreadsheet dataset 20, containing a dataset of data, and a control file 30 and the spreadsheet loader 10 outputs data into a database 35.

Figure 8:
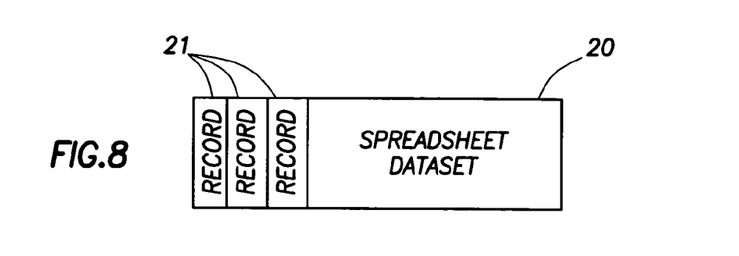
FIG. 8 is a block diagram of a spreadsheet dataset of a preferred embodiment of the present invention.

A spreadsheet dataset 20 may be read by this preferred embodiment of the invention in two ways: as a sequence of rows ("row-based data") or as a sequence of columns ("column-based data"). Referring to FIG. 8, each entry in the spreadsheet dataset is called a record 21. There is a difference in the way the data is processed by the spreadsheet loader 10 for each of the two ways of reading a spreadsheet, as described below.

Row-Based Data

Data in each row represents one or more business objects. A business object is an entity, such as a well in the exploration and production ("E&P") domain. Each column represents an attribute of the business object. (FIG. 5 contains more detail on attributes and is described further below.) The attributes are used to describe some aspect of the business object. In row-based data spreadsheets, attributes are usually separated by a special character, e.g. comma (,), pipe (|), space, or tab, etc.

EXAMPLE 1

| #well_name|uwi|drill_total_depth|tvd_depth|spud_date |
|---|
| DEPAR ET AL 7B WAINWR 7-4-46-6|100070404606W400|632|632|25-SEP-98 |
| HOME EPPING A16 29 47 27|111162904727W300|652.3|652.3|04-JUL-78 |
| PENN WEST PROVOST 14-9-41-8|100140904108W400|905|905|20-FEB-00 |
| 397510 WAINWR 11D-17-45-5|1D0111704505W400|650.7|650.7|29-JUL-76 |
| 397510 WAINWR 11D-17-45-5|1D0111704505W402|650.7|650.7|29-JUL-76 |
| 397510 WAINWR 7-32-45-5|100073204505W400|664.5|664.5|19-OCT-72 |
| 397510 WAINWR 7-32-45-5|100073204505W402|664.5|664.5|19-OCT-72 |
| 397510 WAINWR 7A-29-45-5|100072904505W4001|652.3|652.3|25-AUG-72 |
| 397510 WAINWR 7A-29-45-5|100072904505W402|652.3|652.3|25-AUG-72 |
| 397510 WAINWRIGHT 13-17-45-5|100131704505W400|750|647.4|03-MAY-94 |
| 397510 WAINWRIGHT 6-33-45-5|100063304505W400|676.7|676.7|05-JUN-77 |
| 623396 BRACO EDGER 7-16-45-3|100071604503W400|710|710|29-MAY-90 |

"PENN WEST PROVOST 14-9-41-8|100140904108W400|905|905|20-FEB-00,"

The above row describes a well object with the following attributes: the name of the well, uwi (unique well identifier), "drill_total_depth" (total measured depth), true vertical depth (tvd), and spud_date (the date that drilling of the well began). So in the row above, the well object and its attributes are:

Well (well_name = PENN WEST PROVOST 14-9-41-8
  uwi = 100140904108W400,
  drill_total_depth=905,
  tvd_depth = 905,
  spud_date = 20-FEB-00)

Column-based data

Data in each column is a business object, typically bulk channel data in the exploration and production domain.

EXAMPLE 2

| DEPT | SP | RHOB | GR | POR | PER | DEN |
|---|---|---|---|---|---|---|
| 2000.0000 | 1888.01 | −426.127 | −452.644 | 124.576 | 2.193 | 79.500 |
| 2001.0000 | 1887.03 | −426.654 | −453.271 | 124.574 | 2.174 | 80.812 |
| 2002.0000 | 1887.60 | −427.180 | −453.899 | 133.241 | 2.178 | 78.562 |
| ... | ... | ... | ... | ... | ... | ... |

In the above Example 2, the business objects are Log Channels and one such business object is RHOB. In Example 2, DEPT stands for depth and the other column names for different logging measurements: RHOB stands for Bulk Density, SP for Spontaneous Potential, GR for Gamma Ray, POR for Porosity, DEN for Density and PER for Photoelectric Factor, Right. In Example 2, at 2001 feet deep in the well, the SP measurement was 1887.03, the bulk density measurement was −427.180, the gamma ray measurement was −453.271, the porosity measurement was 124.574, the photoelectric factor, right, measurement was 2.174 and the density measurement was 80.812.

Figure 9:
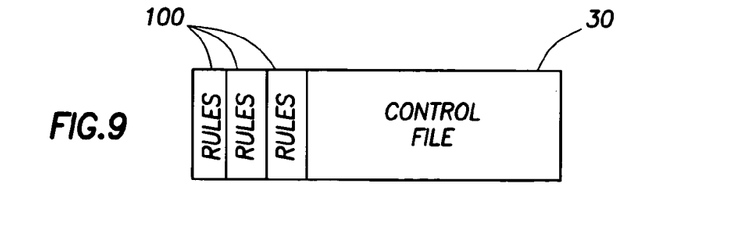
FIG. 9 is a block diagram of control file of a preferred embodiment of the present invention.

Referring to FIG. 9, the control file 30 contains a set of rules 100. The rules 100 may be defined in any language that the spreadsheet loader 10 understands. For the spreadsheet loader 10 of the preferred embodiment of the present invention illustrated in FIG. 1, the control file rules are described in XML. Each control file rule 100 describes how to parse and map the data in the spreadsheet dataset. Each rule 100 has a condition that has to be true for the rule to be evaluated. Conditions are discussed further below, with reference to FIG. 3 and FIG. 4.

Figure 2:
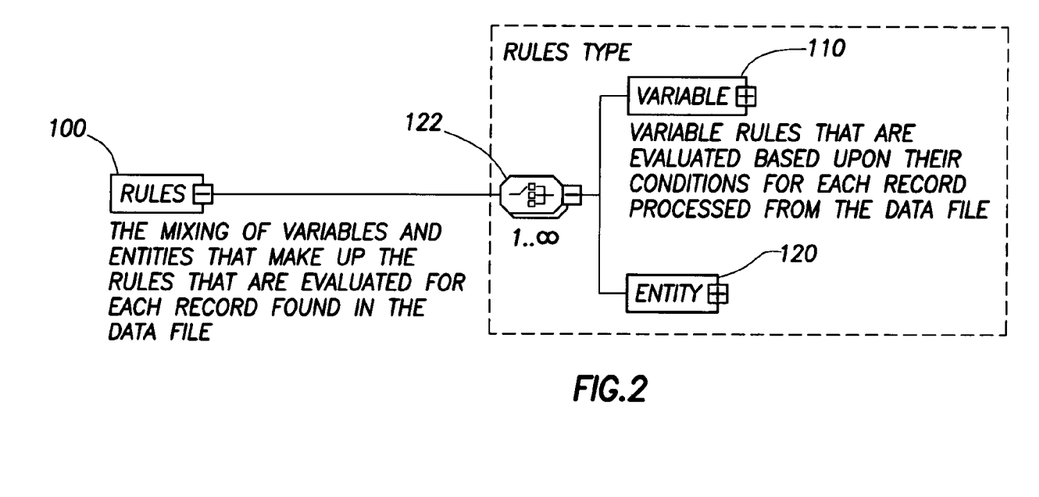
FIG. 2 is a block diagram illustrating the schema for entity rules and variable rules of a preferred embodiment of the present invention.

FIG. 2 is a block diagram illustrating the schema for rules in a preferred embodiment of the present invention. As illustrated in FIG. 2, there are two main types of rules 100 in this preferred embodiment of the present invention: variable rules 110 and entity rules 120. The mixture of variable rules and entity rules that make up the control file are evaluated for each record found in the dataset, to determine if the condition for the rule is evaluated to be true.

Variable Rule 110

Figure 3:
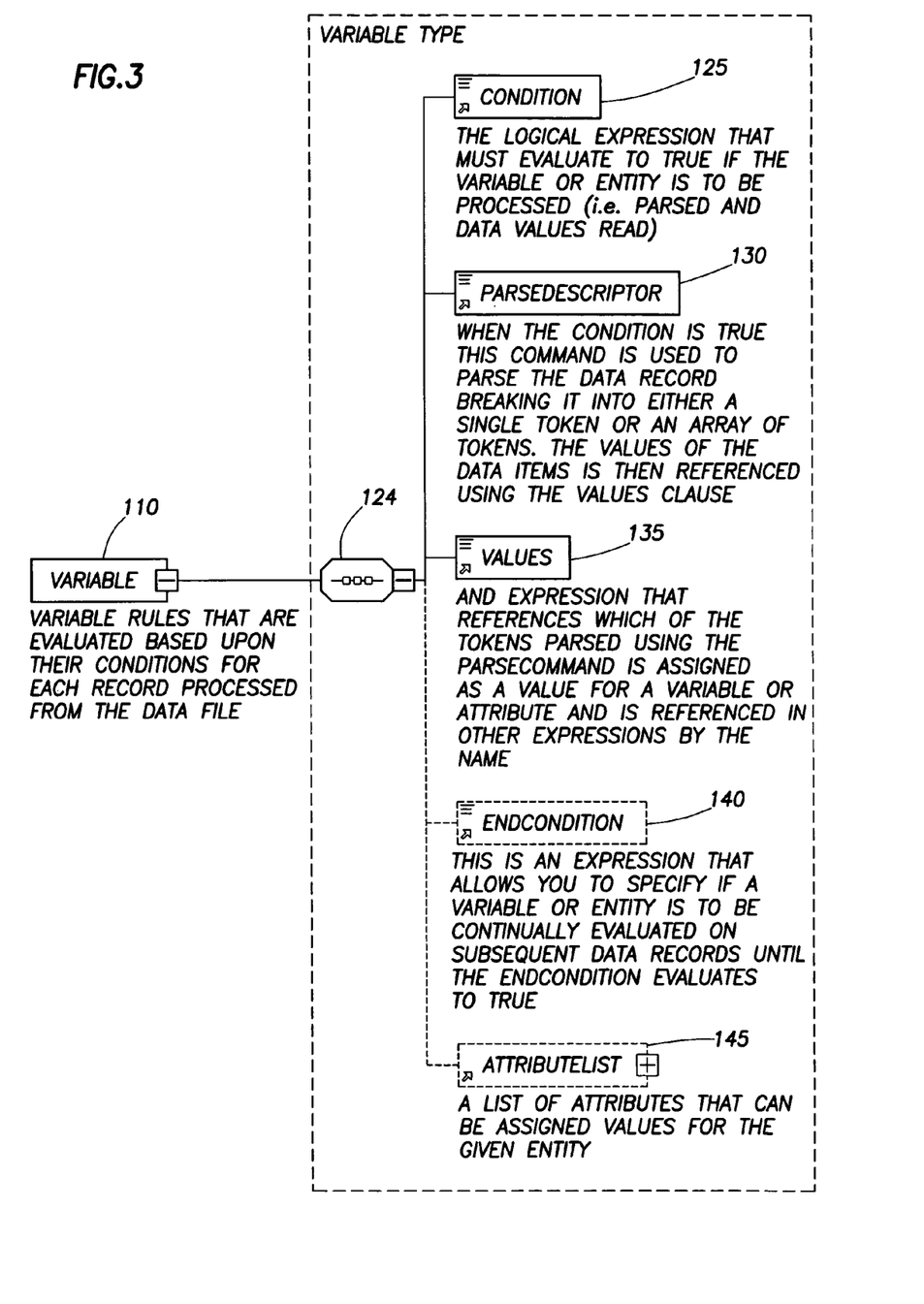
FIG. 3 is a block diagram that depicts further detail for the variable rule in a preferred embodiment of the present invention.

The variable rule is used to read a token. A token is a string or a number read from the data record as described by a parse string. The variable rule reads the token from data in the form of an input text file and stores it as a variable to be used later, in either an entity rule 120 or in a condition of another rule. More information on variable rules is illustrated in FIG. 3 (and discussed below).

Entity Rule 120

Figure 4:
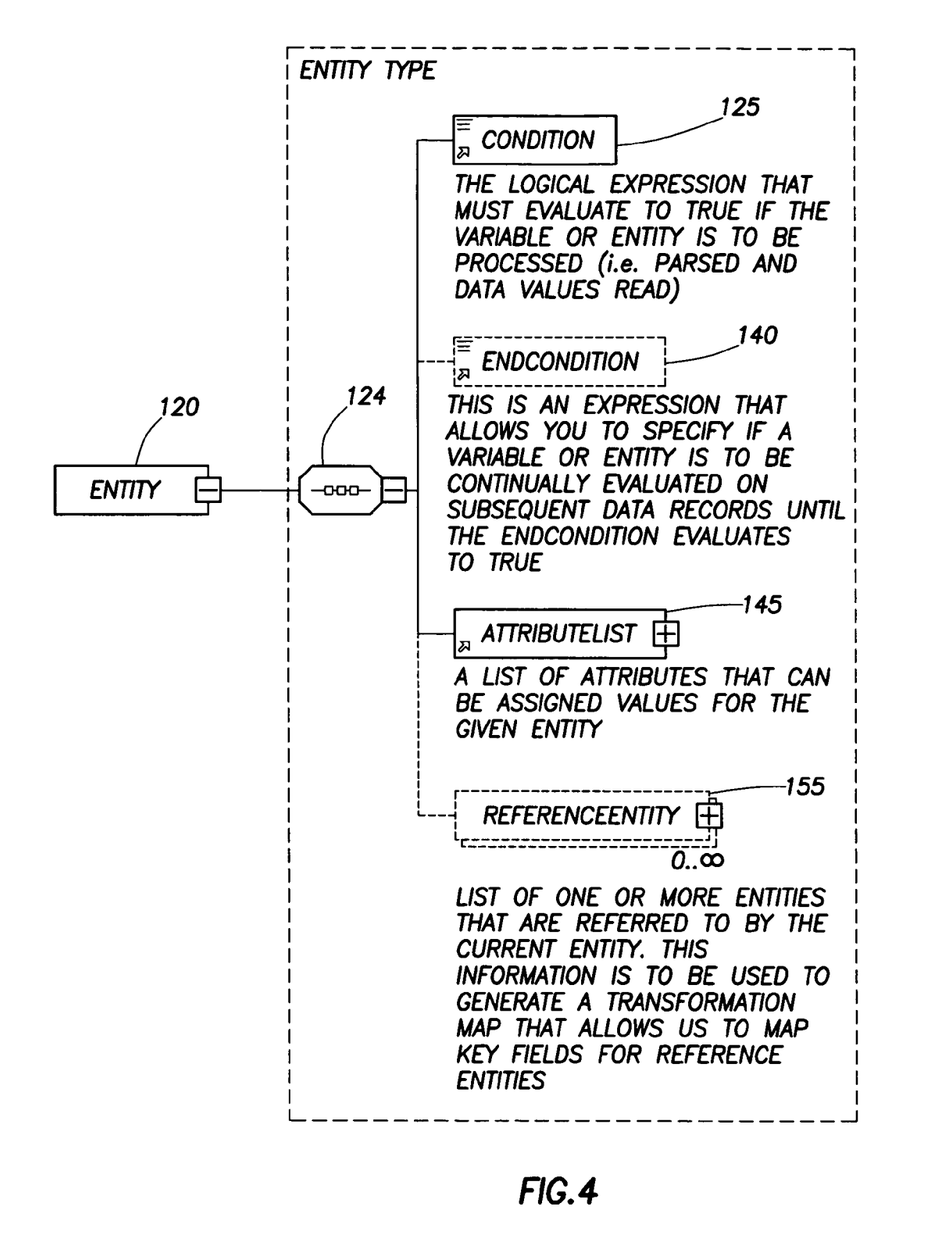
FIG. 4 is a block diagram that depicts further detail for the entity rule in a preferred embodiment of the present invention.

The entity rule 120 describes an entity, an object that is to be created. The entity rule 120 lists attributes of the object and describes how the attributes are set, using a variable rule 110 or the token, which is read from the input text file. More details on entity rules are illustrated in FIG. 4 (and discussed below).

The symbol depicted in FIG. 2 to the right of the rules 100 (and to the left of branches leading to the variable rule 110 and entity rule 120) is an aggregate 122 and means one or many entity or variable rules comprise a set of rules.

Below is an example of the control file 30 that reads the row-based data as shown in EXAMPLE 1 above.

<ControlFile name="GAL Loader" version="1.0">
  <Header>
    <StringDelimiter data_type="string">|</StringDelimiter>

```
        <Comment data_type="string">#</Comment>
        <StartRow data_type="string">2</StartRow>
        <StopRow data_type="string">5</StopRow>
        <Record Length data_type="string">
        </Record Length>
    </Header>
    <Rules>
        <Entity name="XWell" entity_type="Well" operation="create" continue="true"
rank="1" version="1.0">
            <Condition>true</Condition>
            <EndCondition>true</EndCondition>
            <AttributeList>
                <Attribute name="Name" type="ParseDescriptor">
                    <ParseDescriptor>gal_String(1,,"|")</ParseDescriptor>
                    <Values>Name[0]</Values>
                </Attribute>
                <Attribute name="UWI" type="ParseDescriptor">
                    <ParseDescriptor>gal_String(,,"|")</ParseDescriptor>
                    <Values>UWI[0]</Values>
                </Attribute>
            </AttributeList>
        </Entity>
        <Entity name="XBorehole" entity_type="Borehole" operation="create"
continue="true" rank="1" version="1.0">
            <Condition>true</Condition>
            <EndCondition>true</EndCondition>
            <AttributeList>
                <Attribute name="UBHI" type="ParseDescriptor">
                    <ParseDescriptor>gal_String(1,,"|"),gal_String(,,"|")</ParseDescriptor>
                    <Values>UBHI[1]</Values>
                </Attribute>
                <Attribute name="Driller_PBTD" type="ParseDescriptor">
                    <ParseDescriptor>gal_Number(,,"|","float")</ParseDescriptor>
                    <Values>Driller_PBTD[0]</Values>
                </Attribute>
                <Attribute name="Spud_Date" type="ParseDescriptor">
                    <ParseDescriptor>gal_String(,,"|"),gal_Date(,,"|","")</ParseDescriptor>
                    <Values>Spud_Date[1]</Values>
                </Attribute>
            </AttributeList>
        </Entity>
    </Rules>
</Control File>
```

FIG. 3 is a block diagram that depicts further detail for the variable rule 110 in a preferred embodiment of the present invention. Variable rules 110 are evaluated based upon conditions processed from each record in the spreadsheet dataset. The symbol to the right of the variable rule 110 in FIG. 3 is a sequence 124 and means the variable rule is constructed as a sequence of a condition 125, a parsedescriptor 130, a values clause 135 and may (optionally) include an endcondition 140 and an attributelist 145. A condition 125 is a logical state that must evaluate to true if a variable rule (or entity rule as discussed below) is to be processed. The variable rule 110 may include expressions in the condition. An expression describes data, variables or entities.

If the condition 125 is true, the parsedescriptor 130, is used to parse the record by breaking it into either a single token or an array of tokens. The value of the parsed dataset is referenced using a value clause 135. The value clause 135 is an expression that references which of the tokens parsed using the parsedescriptor 130 is assigned a value for a variable or an attribute and is referenced in other expressions by name. The optional endcondition 140 is an expression that allows specifying whether a variable or entity is to be continually evaluated for subsequent data records—in the case of continual evaluation, the endcondition 140 in the preferred embodiment of the invention will evaluate to true. The optional attribute list 145 is a list of attributes that may be assigned values 135 for a given entity.

FIG. 4 is a block diagram that depicts further detail for the entity rule 120 in a preferred embodiment of the present invention. The symbol to the right of the entity rule 120 in FIG. 4 is a sequence 124 and means that an entity rule 120 is comprised of condition 125 and attributelist 145 and optional endcondition 140 and referenceentity 155 clauses. The optional referenceentity 155 is a list of one or more entities that are referenced by the current entity. The referenceentity 155 is used to establish the relational reference between the current entity and other entities being processed by the spreadsheet loader. For example, in the exploration and production domain, a Borehole entity refers to the Well entity, so in the example, the Borehole entity rule can use referenceentity clause 155 to refer to the Well entity rule.

Figure 5:
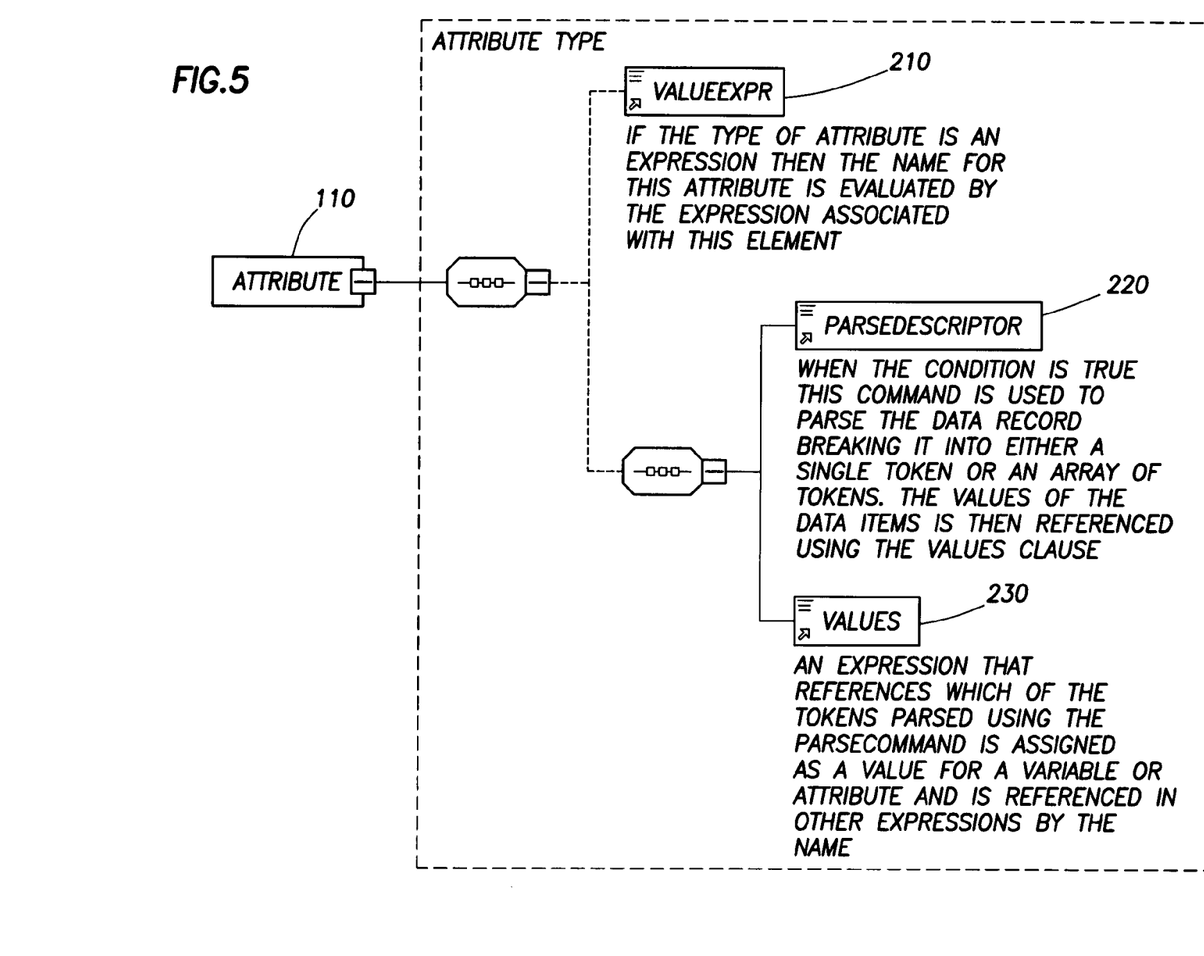
FIG. 5 is a block diagram that depicts further detail for attributes in a preferred embodiment of the present invention.

FIG. 5 is a block diagram that depicts further detail for attributes 200 in a preferred embodiment of the present invention. Attributes 200 refer to aspects of a business object and are defined on the database into which the spreadsheet loader will load the data. The attributes 200 are evaluated as a valueexpr 210 or a parsedescriptor 220 and a value clause 230. The valueexpr 210 is a simple expression or a constant value that is assigned to the attribute. If an attribute 200 is an expression, then the value for the attribute 200 is evaluated by the valueexpr 210. As with the variable rules, the parsedescriptor command 220, is used to parse the data record by breaking it into either a single token or an array of tokens. The value of the parsed data record is referenced using the value clause 230. Some attributes 200 are mandatory for business objects because the attributes 200 are required to be present to create the business object in the relational database (non-null columns). Other attributes are not mandatory.

Figure 6:
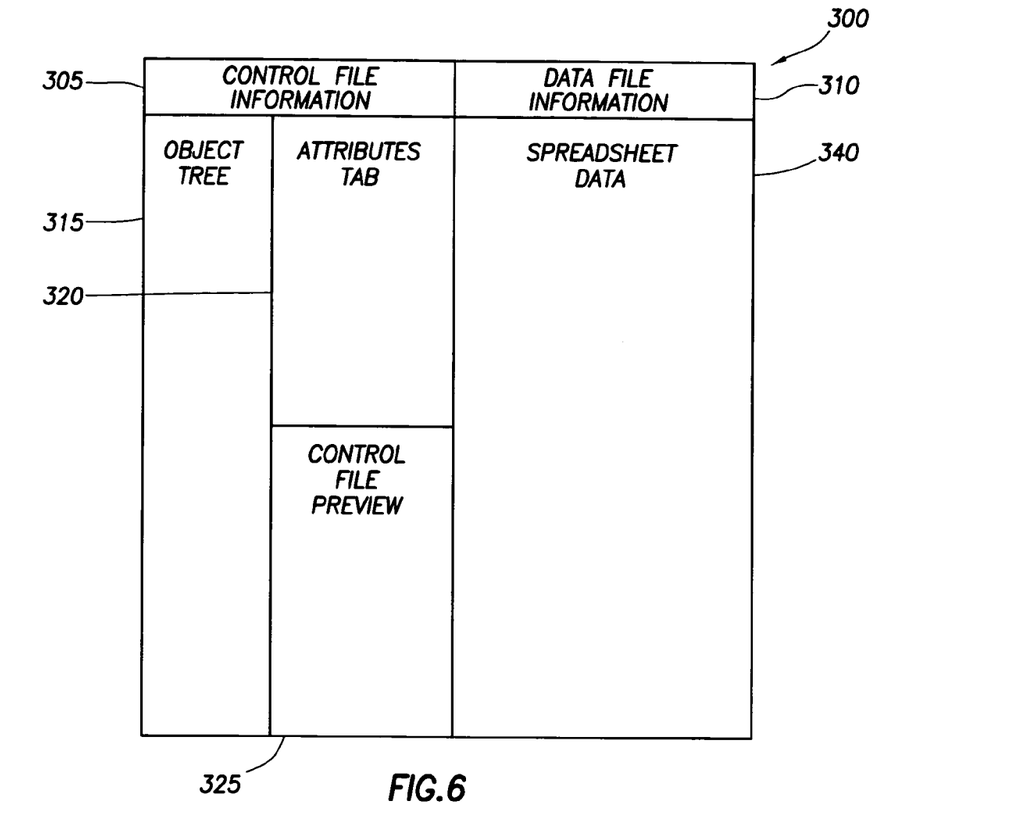
FIG. 6 is a block diagram of a spreadsheet loader user interface for a preferred embodiment of the present invention.

FIG. 6 is a block diagram of a user interface 300 of the spreadsheet loader in a preferred embodiment of the present invention, which is used to build the control file. (The operation of the user interface 300 is also further illustrated in FIG. 7 and discussed below.) Referring to FIG. 6, the user interface 300 has two main panels, the Control File Information panel 305 and the Data File Information panel 310.

The Control File Information panel 305 has three areas: an object tree area 315, an attributes tab area 320 and a control file preview area 325.

The object tree area 315 displays the business objects (not depicted) as supported by the database (not depicted in FIG. 6). The definition of the business objects is preferably described in XML. The object tree area 315 is preferably displayed in a two-tier hierarchy, with a list of Sub Models (not depicted) and then the business objects (not depicted) under each Sub Model. The Sub Models are a grouping of business objects. For example, in E&P domain, there could a Well Sub Model that consists of all Well-related entities/objects.

The attributes tab area 320 displays the attributes (not depicted) of the selected business objects. Each business object when selected in the object tree area 315 brings up a tab in the attributes tab area 320 with a list of attributes for the selected business object. In a preferred embodiment of the invention, the attributes that are mandatory for that business object are displayed in a special way, such as using a different color, so that the user can easily identify them for mapping purposes. (In other embodiments, for color blind users, for instance, shading or bold format could be used to indicate mandatory attributes.)

The data file information panel 310 has a spreadsheet data area 340. The spreadsheet data area 340 displays the data from the spreadsheet dataset 20. The spreadsheet data area 340 includes basic edit operations.

The control file preview area 325 of the control file information panel 305 displays a control file as it is built when the user maps the attributes to columns in the spreadsheet dataset, as reflected in the spreadsheet data area 340.

Figure 7:
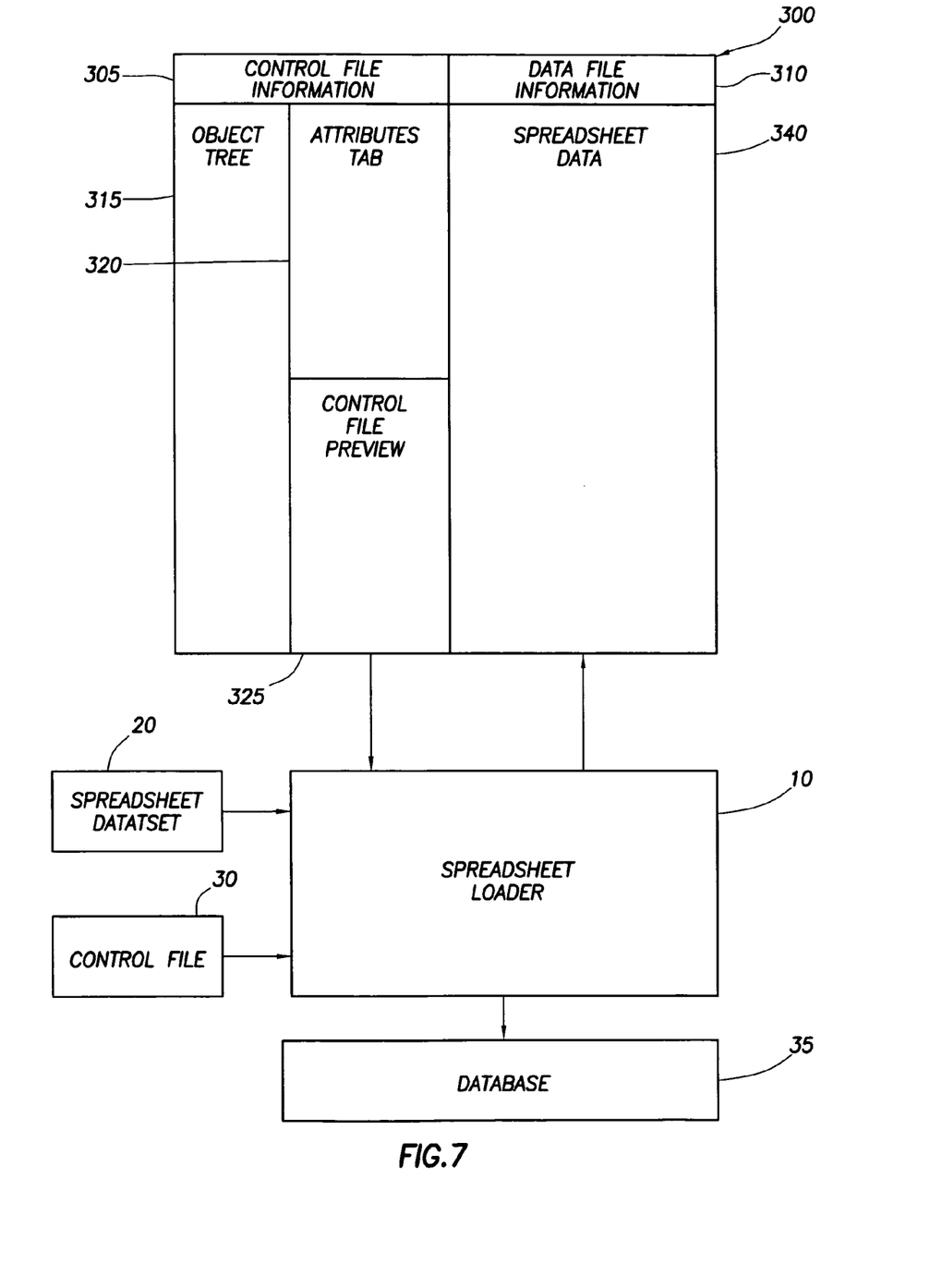
FIG. 7 is a block diagram of a preferred embodiment of the present invention.

The operation of the user interface is further explained by reference to FIG. 7, which is a block diagram of a preferred embodiment of the present invention. It can be difficult to create a control file and the user interface 300 can be used to facilitate this. Referring to FIG. 7, in order to create the control file 30, the user uses the user interface 300 to map the columns in the spreadsheet dataset 20, as reflected in the spreadsheet data area 340 of the user interface 300, to the attributes of one or more business objects in the object tree 315 by using a drag and drop feature of the user interface 300. Specifically, the user may select a business object in the object tree 315, a list of the attributes of the selected business object will open in the attribute tab 320 and the user may drop and drag the attribute name into a column in the spreadsheet data area 340, which reflects the spreadsheet dataset 20. The spreadsheet loader 10 then maps the attribute name to the spreadsheet data area 340 and generates a control file rule (which can be previewed in the control file preview area 325). Once the mapping is completed, the user may load the data into the database 35 using the spreadsheet loader 10.

The user may also define new business objects in the object tree 315, by adding entity definitions and persistence maps (for example, in XML) to be used by a generic data access layer (not depicted in FIG. 7) for the database 35. Entity definitions (not to be confused with entity rules) are descriptions of database objects. Persistence maps are rules that describe, for the data access layer, how the data is written to the database 35 or to some other repository, such as a flat file To create a new business object, the user has to create an Entity Definition for the new business object telling what the new business object is and must create a Persistence map for the new business object telling how the new business object will be written to the database. The spreadsheet loader 10 may pick the entity definitions in the object tree area 315 and the user can use a high level view for mappings.

Figure 10:
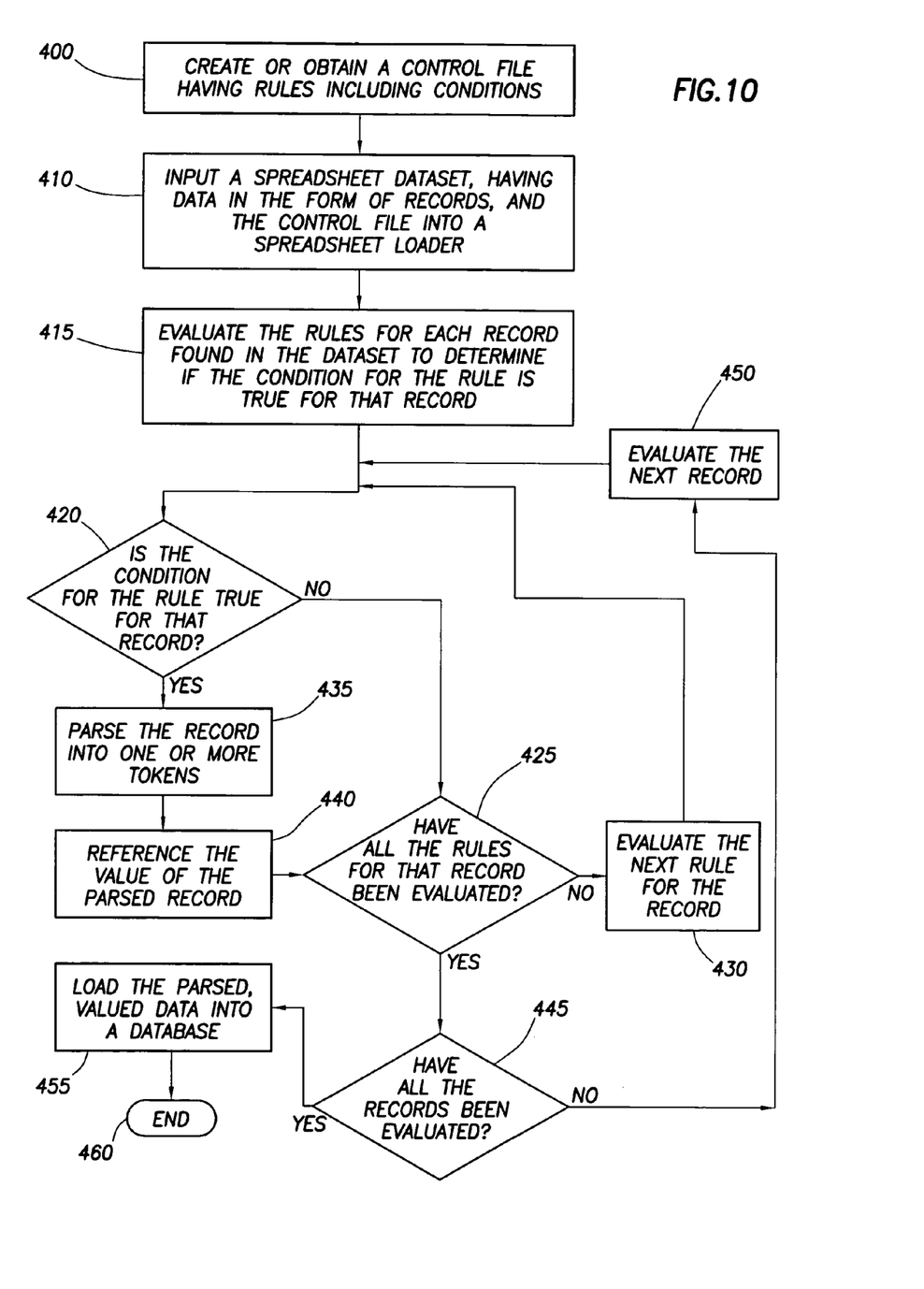
FIG. 10 is a flow chart of a preferred embodiment of the present invention.
Figure 11:
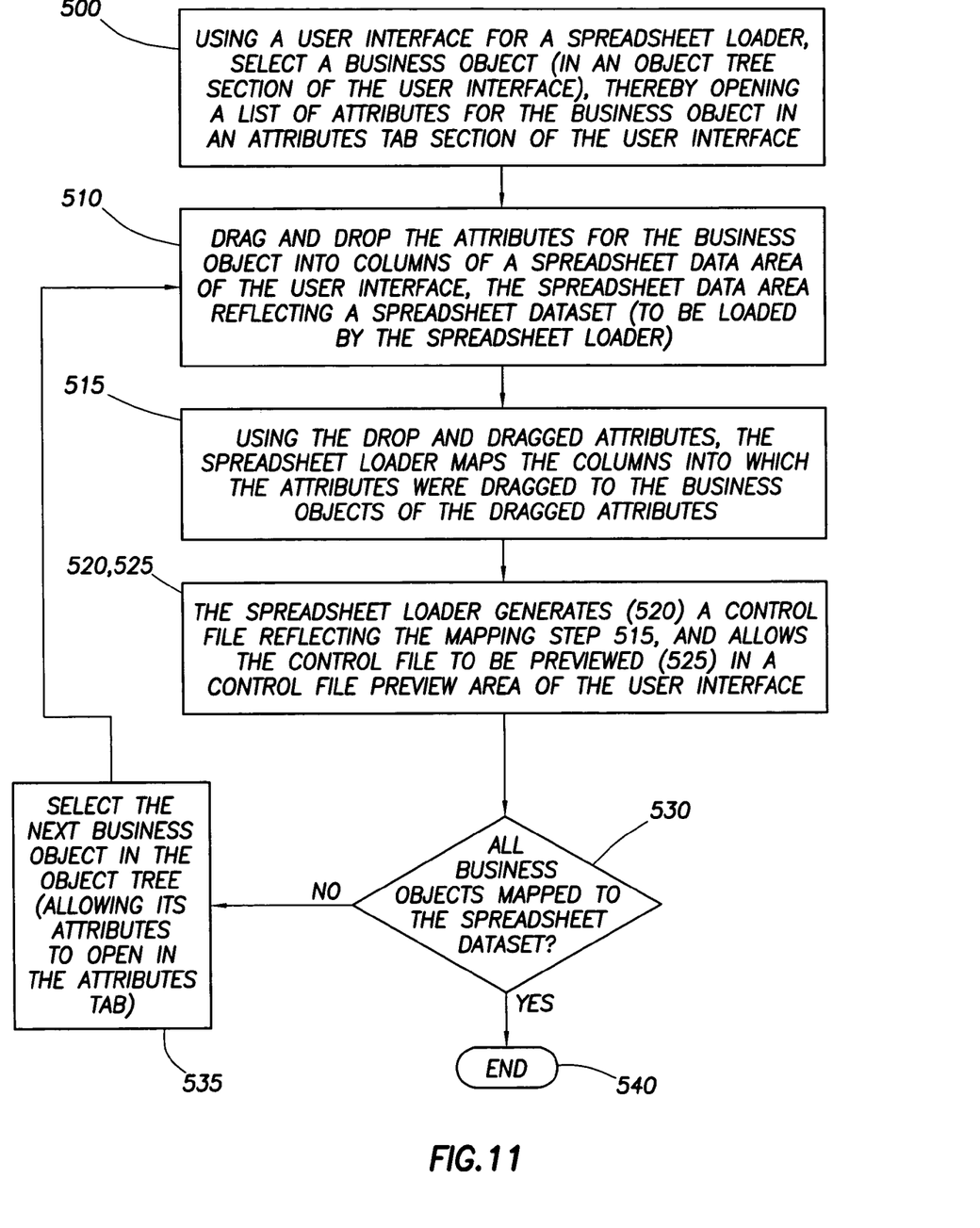
FIG. 11 is a flow chart of how to create a control file in a preferred embodiment of the present invention.

FIG. 10 depicts a flowchart for a preferred embodiment of the present invention. First, one creates or obtains 400 a control file having rules, each rule including a condition. (A method for creating a control file is illustrated in FIG. 11, discussed below, as well as in the discussion above with respect to FIG. 6 and FIG. 7.) A spreadsheet dataset, having data in the form of records, and the control file are inputted 410 into a spreadsheet loader. Each rule of the control file is evaluated 415 for each record found in the dataset to determine 420 if the condition for the rule is true for that record. If 425 the condition is not true, all the other rules for that record are evaluated 430, until complete. If the condition is true, then the record is parsed 435 into one or more tokens. The value of the parsed record is referenced 440 using a value clause. If all the rules have not been evaluated for the record 425, then evaluate 430 all other rules until complete, and then evaluate 445, 450 rules for all other records until complete. Once all rules for a record are completely evaluated, the parsed, valued data is loaded 455 into a database and the process ends 460.

Remember that rules may be variable rules or entity rules. As part of this process, a rule (variable or entity) may have an endcondition that evaluates to true if the rule is to be continually evaluated for subsequent data records. In addition, an entity rule will have attributelist for the entity and may have a referenceentity used to establish the relational reference between the current entity and other entities.

FIG. 11 depicts a flowchart for how to create a control file in a preferred embodiment of the present invention. Using a user interface for a spreadsheet loader, a business object (in an object tree section of the user interface) is selected 500, thereby opening a list of attributes for the selected business object in an attributes tab section of the user interface. The attributes for the business object are dragged and dropped 510 into columns of a spreadsheet data area of the user interface, the spreadsheet data area reflecting a spreadsheet dataset that is to be loaded by the spreadsheet loader. Using the drop and dragged attributes, the spreadsheet loader maps 515 the columns into which the attributes were dragged to the business objects of the dragged attributes. The spreadsheet loader generates 520 a control file reflecting the mapping step 515, and allows the control file to be previewed 525 in a control file preview area of the user interface. If 530 all business objects have not been mapped, the next business object is selected 535 and the process repeats, until complete 540.

The present invention solves the problem of inserting/updating/overwriting data coming in ASCII spreadsheet (including excel files) in a generic way. While loading data, the present invention hides the complexity of the target database from the end user and resolves any relationship (using the ReferencedEntity clause) among the business objects, totally transparent to the user.

The present invention may be used to load in any target repository provided the generic data access layer supports a target adapter. The present invention may also be used to create business objects in memory for direct use by applications. The front end of spreadsheet loader, which reads data as business objects (which can be defined by the user) from spreadsheet data file, may allow the user perform mapping using a generic user interface. This approach could also be used to load the data in memory in the user defined business objects for direct use by applications.

Although the foregoing is provided for purposes of illustrating, explaining and describing certain embodiments of the automated repetitive array microstructure defect inspection invention in particular detail, modifications and adaptations to the described methods, systems and other embodiments will be apparent to those skilled in the art and may be made without departing from the scope or spirit of the invention.

What is claimed is:

1. A computer system for loading data from a spreadsheet dataset, having data in the form of one or more records, into a database comprising:
   a) a storage device configured to store a control file containing a set of rules, each rule having a condition, wherein the set of rules describe mappings between attributes of the spreadsheet dataset and attributes of a business object;
   b) a processor configured to execute a spreadsheet loader having as inputs the spreadsheet dataset and the control file, wherein:
      i) each rule in the control file is evaluated for each record to determine if the condition is true for the record, and the records being parsed into one or more tokens if the condition is true;
      ii) each of the one or more tokens are assigned values based on a value clause, wherein each of the values is associated with one of the attributes of the business object; and
      iii) the spreadsheet loader sends the parsed data to the database, wherein the parsed data is stored in the database using a data access layer comprising an entity definition and a persistence map, wherein the entity definition defines the business object based on attributes of the database and the persistence map defines how to store the parsed data in the database.

2. A computer system in accordance with claim 1, wherein the set of rules within the control file includes a variable rule.

3. A computer system in accordance with claim 2, wherein the variable rule comprises a condition, a parsedescriptor, and the value clause.

4. A computer system in accordance with claim 3, wherein the variable rule includes an endcondition.

5. A computer system in accordance with claim 3, wherein the variable rule includes an attributelist.

6. A computer system in accordance with claim 1, wherein the set of rules within the control file includes an entity rule.

7. A computer system in accordance with claim 6, wherein the entity rule is comprised of a condition and an attributelist.

8. A computer system in accordance with claim 7, wherein the entity rule includes an endcondition clause.

9. A computer system in accordance with claim 7, wherein the entity rule includes a referenceentity clause.

10. A computer system in accordance with claim 1, wherein the set of rules in the control file contain a variable rule and an entity rule.

11. A computer system in accordance with claim 1, further comprising a user interface used to create the control file.

12. A computer system as in claim 11, wherein the user interface includes a control file information section, having an object tree, attributes tab, and control file preview area, and a data file information section, having a spreadsheet data area reflecting the spreadsheet dataset, wherein:
   a) selecting the business object in the object tree opens a list of one or more attributes for the business object in the attributes tab;
   b) attributes from the open list of attributes may be dragged and dropped into columns in the spreadsheet data area; and
   c) the spreadsheet dataloader uses the attributes dropped into the spreadsheet data area to map the columns to the business objects and to create the control file from the mapping.

13. A computer system as in claim 12 wherein the control file may be previewed in a control file preview area in the user interface.

14. A computer system as in claim 12 wherein the attributes in the attribute tab that are mandatory for the selected business object are distinguished from attributes that are not mandatory.

15. A computer system as in claim 14 wherein the mandatory attributes are distinguished by color.

16. A computer system as in claim 14 wherein the mandatory attributes are distinguished by shading.

17. A computer system as in claim 14 wherein the mandatory attributes are distinguished by a special font.

18. A computer system as in claim 12 wherein the spreadsheet data area of the user interface includes editing functions.

19. A computer system as in claim 12 wherein the object tree displays a two-tier hierarchy, with a list of sub models, being groups of business objects, with business objects under each sub model.

20. A computer system as in claim 12, wherein the data access layer in the database allows entity definitions and persistence maps to be used to create new business objects in the object tree.

21. A computer system as in claim 1, wherein the data in the spreadsheet dataset is row-based data.

22. A computer system as in claim 1, wherein the data in the spreadsheet dataset is column-based data.

23. A computer system as in claim 1, wherein the set of rules within the control file includes a variable rule, wherein the variable rule comprises a condition, a parsedescriptor, and the value clause and an entity rule comprised of a condition and an attributelist.

24. A computer system in accordance with claim 23, further comprising a user interface used to create the control file, wherein the user interface includes a control file information section, having an object tree, attributes tab, and control file preview area, and a data file information section, having a spreadsheet data area reflecting the spreadsheet dataset, wherein:
   a) selecting the business object in the object tree opens a list of one or more attributes for the business object in the attributes tab;
   b) attributes from the open list of attributes may be dragged and dropped into columns in the spreadsheet data area;
   c) the spreadsheet dataloader uses the attributes dropped into the spreadsheet data area to map the columns to the business objects and to create the control file from the mapping; and
   d) the control file may be previewed in a control file preview area in the user interface.

25. A computer system as in claim 12, wherein the attributes are defined on the database.

26. A computer system as in claim 12, wherein at least one attribute is evaluated using a valueexpr clause.

27. A computer system as in claim 12, wherein at least one attribute is parsed using a parsedescriptor command and the value of the parsed attribute is referenced using the value clause.

28. A method for loading data from a spreadsheet dataset, having data in the form of one or more records, into a database comprising:
   a) creating a control file having rules, each rule including a condition, wherein the rules describe mappings between attributes of the spreadsheet dataset and attributes of a business object;
   b) inputting the spreadsheet dataset and the control file into a spreadsheet loader;
   c) evaluating each rule with respect to each record to determine if the condition for the rule is true for that record and if the condition is true, then parsing the record into one or more tokens and referencing values for each of the one or more tokens using a value clause of the rule, wherein each of the values is associated with one of the attributes of the business object;
   d) sending the parsed, valued data to the database, wherein the parsed, valued data is stored in the database using a data access layer comprising an entity definition and a persistence map, wherein the entity definition defines the business object based on attributes of the database and the persistence map defines how the parsed, valued data is stored in the database.

29. A method as in claim 28, wherein the data in the spreadsheet dataset is row-based data.

30. A method as in claim 28, wherein the data in the spreadsheet dataset is column-based data.

31. A method as in claim 28, wherein a step for creating a control file further comprises:
   i) by using a user interface for a spreadsheet loader, selecting the business object in an object tree section of the user interface, wherein the selection of the business object opens a list of attributes for the selected business object in an attributes tab section of the user interface;
   ii) dragging and dropping the attributes for the selected business object into columns of a spreadsheet data area of the user interface, the spreadsheet data area reflecting a spreadsheet dataset that is to be loaded by the spreadsheet loader;
   iii) using the drop and dragged attributes, mapping the columns into which the attributes were dragged to the business objects of the dragged attributes;
   iv) generating a control file reflecting the mapping step a)(iii).

32. A method as in claim 31, wherein a step for creating a control file further comprises:
   v) previewing the generated control file in a control file preview area of the user interface.

33. A method as in claim 28, wherein the set of rules within the control file includes a variable rule.

34. A method as in claim 33, wherein the variable rule comprises a condition, a parsedescriptor, and a values clause.

35. A method as in claim 34, wherein the variable rule further includes an endcondition.

36. A method as in claim 34, wherein the variable rule further includes an attributelist.

37. A method as in claim 28, wherein the set of rules within the control file includes an entity rule.

38. A method as in claim 37, wherein the entity rule comprises a condition and an attributelist.

39. A method as in claim 38, wherein the entity rule includes an endcondition clause.

40. A method as in claim 38, wherein the entity rule includes a referenceentity clause.

41. A method as in claim 28, wherein the set of rules in the control file contain a variable rule and an entity rule.

42. A method as in claim 31, wherein the attributes in the attribute tab that are mandatory for the selected business object are distinguished from attributes that are not mandatory.

43. A method as in claim 42, wherein the mandatory attributes are distinguished by color.

44. A method as in claim 42, wherein the mandatory attributes are distinguished by shading.

45. A method as in claim 42, wherein the mandatory attributes are distinguished by a special font.

46. A method as in claim 31, wherein editing functions may be performed using the spreadsheet data area of the user interface.

47. A method as in claim 31, wherein the object tree displays a two-tier hierarchy, with a list of sub models, being groups of business objects, with business objects under each sub model.

48. A method as in claim 31, wherein the data access layer in the database allows entity definitions and persistence maps to be used to create new business objects in the object tree.

49. A method as in claim 31, wherein the attributes are defined on the database.

50. A method as in claim 49, wherein at least one attribute is evaluated using a valueexpr clause.

51. A method as in claim 49, wherein at least one attribute is parsed using a parsedescriptor command and a value of the parsed attribute is referenced using a value clause.

52. A method as in claim 32, wherein the rules within the control file include a variable rule, comprising a condition, a parsedescriptor, and a values clause, and the rules include an entity rule comprised of a condition and an attributelist.

53. A system for loading data from a spreadsheet dataset, having data in the form of one or more records, into a database comprising:
   a) a storage device configured to store a control file having rules, each rule including a condition, wherein the rules describe mappings between attributes of the spreadsheet dataset and attributes of a business object;
   b) a processor configured to execute a spreadsheet loader having inputs of the spreadsheet dataset and the control file and having a program storage device readable by a machine, tangibly embodying a program of instructions executable by the machine to perform the following method steps:
      evaluating each rule with respect to each record to determine if the condition for the rule is true for that record and if the condition is true, then parsing the record into one or more tokens and referencing values for each of the one or more tokens using a value clause of the rule, wherein each of the values is associated with one of the attributes of the business object;
      sending the parsed, valued data to the database, wherein the parsed, valued data is stored in the database using a data access layer comprising an entity definition and a persistence map, wherein the entity definition defines the business object based on attributes of the database, and the persistence map defines how the parsed valued data is stored in the database.

54. A system as in claim 53, wherein the data in the spreadsheet dataset is row-based data.

55. A system as in claim 53, wherein the data in the spreadsheet dataset is column-based data.

56. A system as in claim 53, wherein the control file is created by the following steps:
   i) by using a user interface for a spreadsheet loader, selecting the business object in an object tree section of the user interface, wherein the selection of the business object opens a list of attributes for the selected business object in an attributes tab section of the user interface;
   ii) dragging and dropping the attributes for the selected business object into columns of a spreadsheet data area of the user interface, the spreadsheet data area reflecting a spreadsheet dataset that is to be loaded by the spreadsheet loader;
   iii) using the drop and dragged attributes, mapping the columns into which the attributes were dragged to the business objects of the dragged attributes;
   iv) generating a control file reflecting the mapping step a)(iii).

57. A system as in claim 56, further comprising:
   vi) previewing the generated control file in a control file preview area of the user interface.

58. A system as in claim 53, wherein the set of rules within the control file includes a variable rule having a condition, a parsedescriptor, and a values clause.

59. A system as in claim 53, wherein the set of rules within the control file includes an entity rule, having a condition and an attributelist.

60. A system as in claim 53, wherein the set of rules in the control file contain a variable rule and an entity rule.

61. A system as in claim 56, wherein the attributes in the attribute tab that are mandatory for the selected business object are distinguished from attributes that are not mandatory.

62. A system as in claim 61, wherein the mandatory attributes are distinguished by color.

63. A system as in claim 61, wherein the mandatory attributes are distinguished by shading.

64. A system as in claim 61, wherein the mandatory attributes are distinguished by a special font.

65. A system as in claim 56, wherein editing functions may be performed using the spreadsheet data area of the user interface.

66. A system as in claim 56, wherein the object tree displays a two-tier hierarchy, with a list of sub models, being groups of business objects, with business objects under each sub model.

67. A system as in claim 56, wherein the data access layer in the database allows entity definitions and persistence maps to be used to create new business objects in the object tree.

68. A system as in claim 56, wherein the attributes are defined on the database.

69. A system as in claim 68, wherein at least one attribute is evaluated using a valueexpr clause.

70. A system as in claim 69, wherein at least one attribute is parsed using a parsedescriptor command and a value of the parsed attribute is referenced using a value clause.

* * * * *